United States Patent [19]
Looper et al.

[11] Patent Number: 5,055,728
[45] Date of Patent: Oct. 8, 1991

[54] MOTOR ASSEMBLY WITH COMBINED ARMATURE SHAFT BEARING SUPPORT AND BRUSH TUBE HOLDER

[75] Inventors: Timothy J. Looper; James R. Sistare, both of Pickens, S.C.

[73] Assignee: Ryobi Motor Products Corp., Pickens, S.C.

[21] Appl. No.: 565,252

[22] Filed: Aug. 9, 1990

[51] Int. Cl.⁵ .............................................. H02K 5/00
[52] U.S. Cl. ...................................... 310/91; 310/62; 310/90; 310/239
[58] Field of Search ...................... 310/89, 90, 91, 239, 310/241, 242, 245, 247, 248, 42, 62, 63, 43, 254, 261, 179

[56] References Cited

U.S. PATENT DOCUMENTS

| | | | |
|---|---|---|---|
| 3,694,680 | 9/1972 | Jacyno | 310/91 |
| 3,978,354 | 8/1976 | Lee | 310/63 |
| 4,219,749 | 8/1980 | Rettberg | 310/89 |
| 4,342,929 | 8/1982 | Horne | 310/43 |
| 4,774,430 | 9/1988 | Rodriguez | 310/241 |
| 4,896,067 | 1/1990 | Walther | 310/91 |

Primary Examiner—R. Skudy
Attorney, Agent, or Firm—David L. Davis

[57] ABSTRACT

A motor assembly including a unitary member which functions as a combined armature shaft bearing support and brush tube holder. The member is a molded plastic piece which has two legs extending from a bearing support portion and straddling the commutator and armature shaft of the motor for attachment to the motor field assembly. Ledges are formed in the legs to hold the brush tubes, which have lanced projections cooperating with notches formed in the legs for precisely locating the brush tubes and preventing longitudinal movement thereof. To clamp the brush tubes to the ledges, shoulders are provided adjacent the ledges and tabs straddling the brush tubes and the shoulders are secured by screws which pass through the tabs and into the shoulders. In order to accommodate different size brush tubes, different height shoulders are provided on opposite sides of the ledges. In addition, the legs are open at both ends of the ledges to accommodate different lengths of brush tubes.

3 Claims, 4 Drawing Sheets

MOTOR ASSEMBLY WITH COMBINED ARMATURE SHAFT BEARING SUPPORT AND BRUSH TUBE HOLDER

BACKGROUND OF THE INVENTION

This invention relates to motor assemblies, and more particularly, to a motor assembly with a combined armature shaft bearing support and brush tube holder.

When designing a line of motor driven tools, such as circular saws, it is advantageous to have as much commonality of parts as possible between the different tools within the line. This commonality of parts is especially appropriate for the motor assembly of the tool, since different tools within a line may be provided with motors of varying horsepower. It is therefore an object of the present invention to provide a motor assembly for a power tool which is so designed as to maximize commonality of parts for motors having different power outputs.

In the past, it was conventional to design power tools so that the motor assembly was held together by the housing and was not assembled separately from the housing. Thus, for example, holders for the shaft bearings and holders for the brush tubes were molded as part of the housing, rather than being part of the motor assembly, per se. In a new tool design, the motor assembly is assembled by itself separate from the tool housing and then the housing is secured to the motor assembly. In this design, there is a single member which acts as both the bearing support for the commutator end of the motor shaft and the holder for the brush tubes. Since different size motors typically utilize different size brush tubes, it is another object of this invention to provide a combined bearing support and brush tube holder of the type described which can accommodate different size brush tubes.

SUMMARY OF THE INVENTION

The foregoing and additional objects are attained in accordance with the principles of this invention by providing a motor assembly comprising a field including a laminated stack and a field winding supported on the stack, an armature including an armature shaft, an armature winding supported on the armature shaft, a commutator electrically coupled to the armature winding and supported on the armature shaft adjacent a first end thereof, and a fan supported on the armature shaft adjacent the other end thereof, a pair of tubes each containing a commutator brush, a fan shroud, a member acting as a unitary bearing support and brush tube holder, the member having a pair of legs adapted to straddle the first end of the armature shaft with the legs being diametrically symmetrical to each other with respect to the axis of the armature shaft, each of the legs being formed with a brush tube support ledge in line with the commutator, each of the ledges being generally planar and orthogonal to the armature shaft axis, the ledges being substantially coplanar with respect to each other, each of the legs being open to the commutator in a region above its respective support ledge, each of the legs being formed with a first shoulder on one side of its respective support ledge and a second shoulder on the other side of its respective support ledge opposite the first shoulder, the first shoulder of each of the legs extending above the respective support ledge a distance corresponding to the height of a first size brush tube and the second shoulder of each of the legs extending above the respective support ledge a distance corresponding to the height of a second size brush tube, and means on each of the shoulders for engaging a brush tube clamp, and means for securing the fan shroud to one side of the stack and the member to the other side of the stack.

In accordance with an aspect of this invention, the member is formed with a bridge portion connecting the legs at an end thereof, the bridge portion being formed with a recess for holding a bearing, the assembly further including a bearing for the armature shaft supported in the recess.

In accordance with another aspect of this invention, each of the commutator brush tubes includes a pair of longitudinally spaced lanced tabs at predetermined fixed reference locations and each of the legs is formed with a notch adjacent each support ledge to accept the pair of tabs therein so as to accurately locate the brush tubes on the support ledges and prevent longitudinal movement of the brush tubes.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
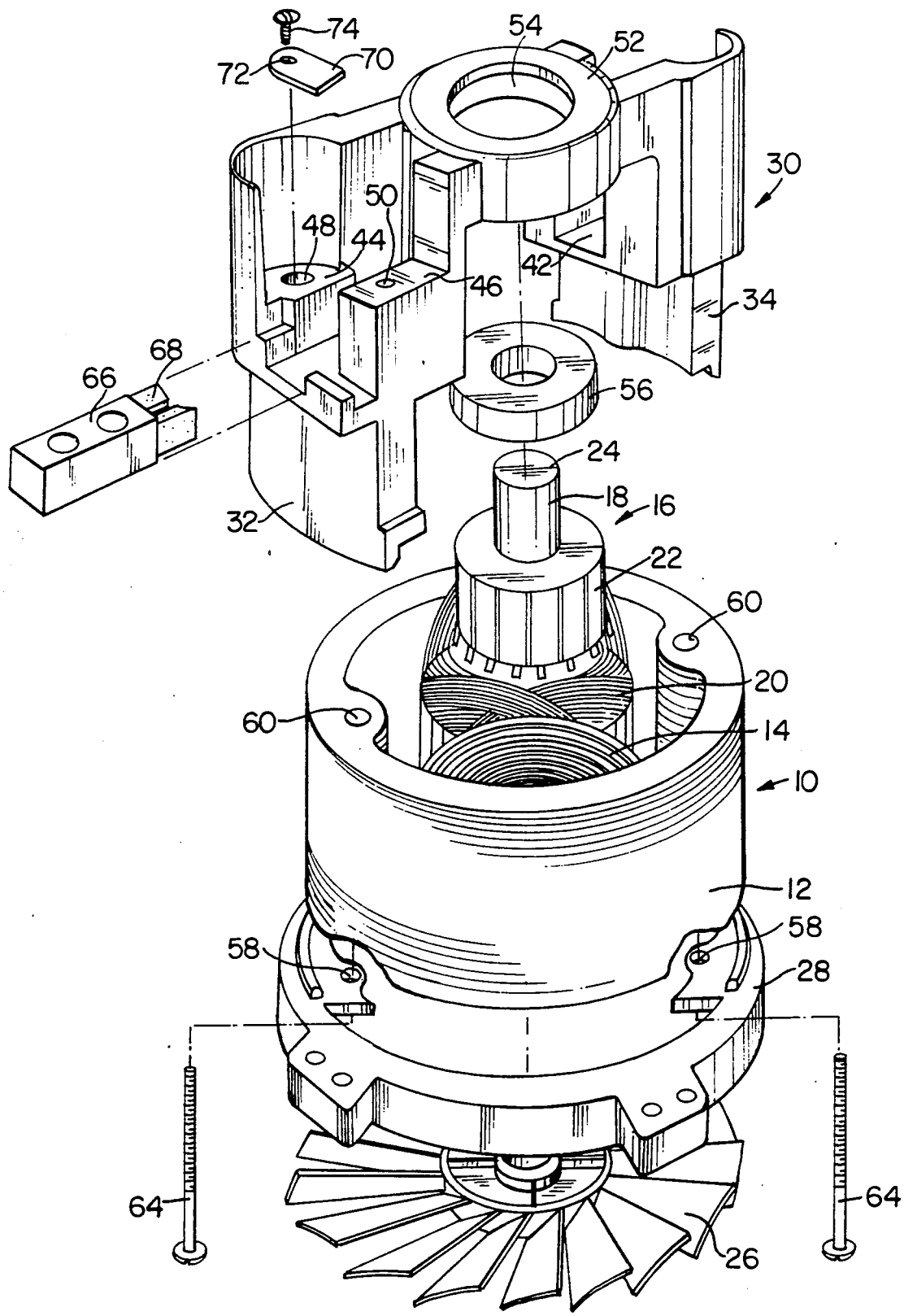
FIG. 1 is an exploded perspective view of a motor assembly constructed in accordance with the principles of this invention.
Figure 2:
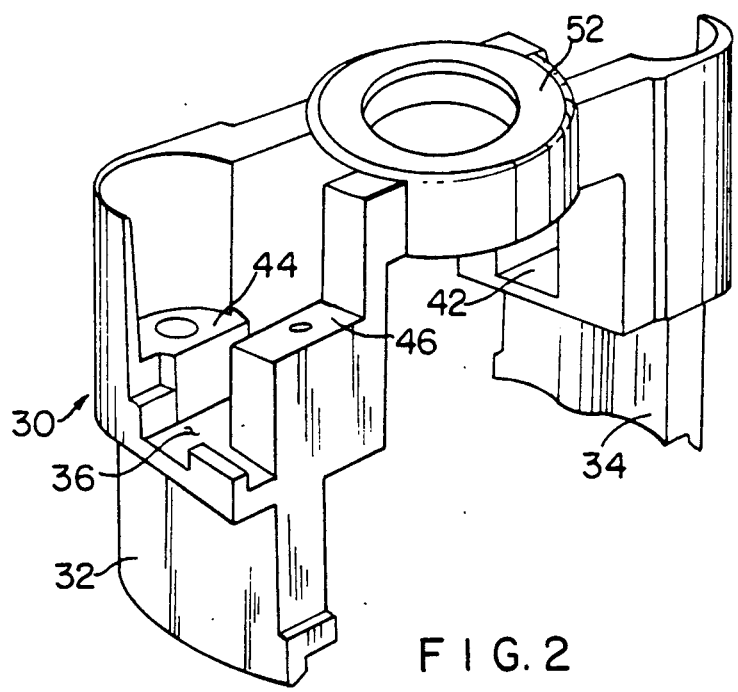
FIG. 2 is a perspective view of the member which functions as a combined armature shaft bearing support and brush tube holder, according to this invention.

Referring to the drawings, FIG. 1 shows a motor assembly according to this invention which includes a field 10 having a laminated stack 12 and a field winding 14 supported on the stack 12. The motor assembly also includes an armature 16 having an armature shaft 18, an armature winding 20 supported on the shaft 18, a commutator 22 electrically coupled to the winding 20 and supported on the shaft 18 adjacent a first end 24 of the shaft 18, and a fan 26 supported on the shaft 18 adjacent its other end. The assembly also includes a molded fan shroud 28.

Figure 4:
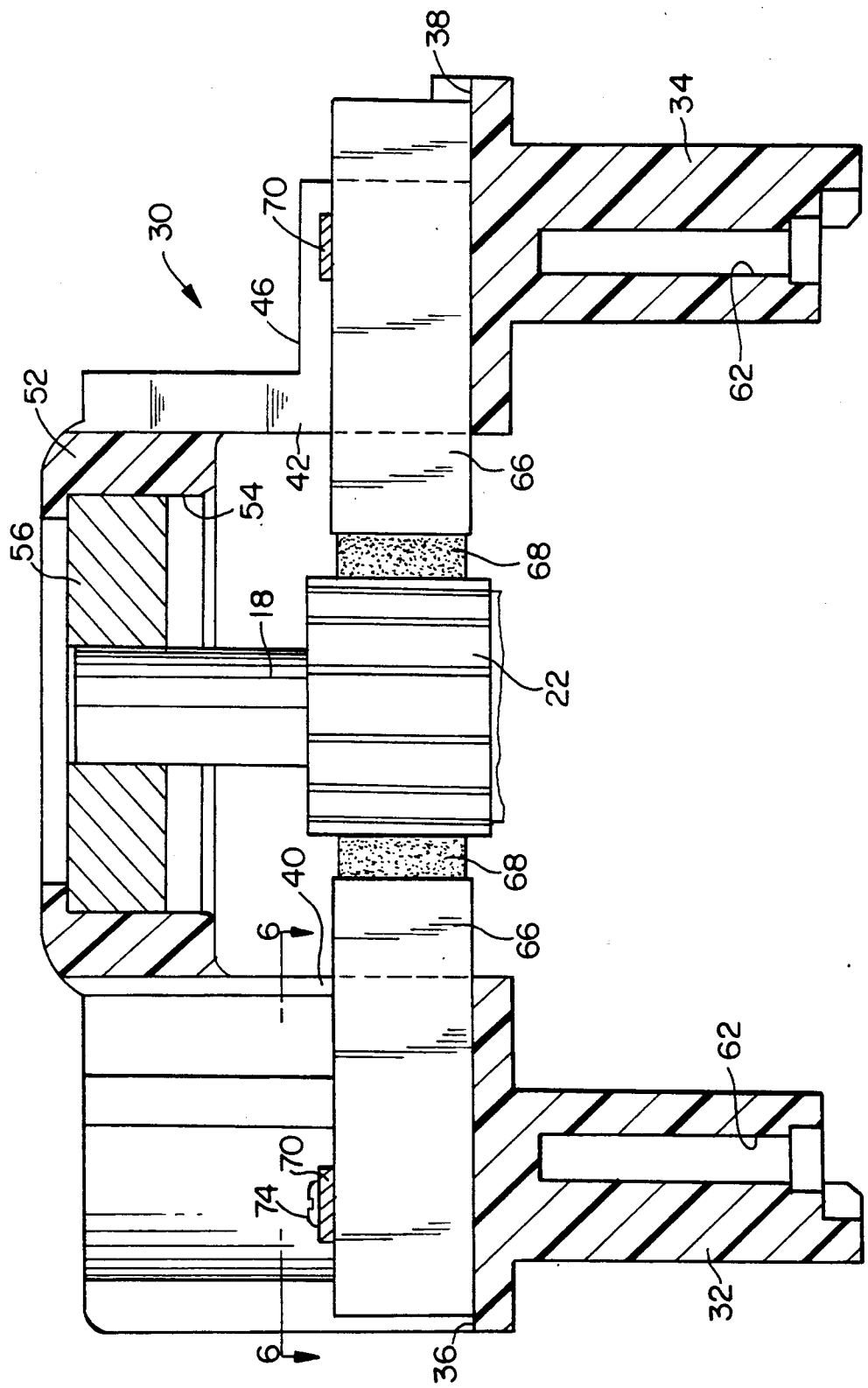
FIG. 4 is a cross sectional view showing part of the armature and a first size brush tube supported in the member of FIG. 2.

According to this invention, the motor assembly includes a unitary member 30 which functions as a combined bearing support and brush tube holder. The member 30 is preferably molded plastic and is formed with a pair of legs 32, 34 which straddle the first end 24 of the armature shaft 18. The legs 32, 34 are diametrically symmetrical to each other with respect to the axis of the shaft 18 and each of the legs 32, 34 is formed with a brush tube support ledge 36, 38, (FIG. 4) respectively, in line with the commutator 22 when the motor assembly is put together. Each of the ledges 36, 38 is generally planar and orthogonal to the axis of the armature shaft 18, with the ledges 36, 38 being substantially coplanar with respect to other. Above the ledge 36, the leg 32 is open at 40 (FIG. 4) to the commutator 22. Similarly, above the ledge 38, the leg 34 is open at 42 to the commutator 22.

According to this invention, the member 30 is designed to accommodate different size brush tubes which hold different size brushes for motors having different power ratings. Thus, the leg 32 is formed with a first shoulder 44 on one side of the ledge 36 and a second shoulder 46 on the other side of the ledge 36 opposite the first shoulder 44. The first shoulder 44 extends a first distance above the ledge 36 and terminates in a surface parallel to the ledge 36 to accommodate a first size brush tube and the second shoulder 46 extends a second distance above the ledge 36 terminating in a planar surface parallel to the ledge 36 to accommodate a second size brush tube. The shoulder 44 is formed with a bore 48 and the shoulder 46 is formed with a bore 50, each for a purpose to be described hereinafter. Shoulders corresponding to shoulders 44 and 46 are also provided on the leg 34. The member 30 is further formed with a bridge portion 52 which connects the legs 32 and 34 at an end thereof. The bridge portion 52 is formed with a recess 54 for holding an armature shaft bearing 56.

Figure 5:
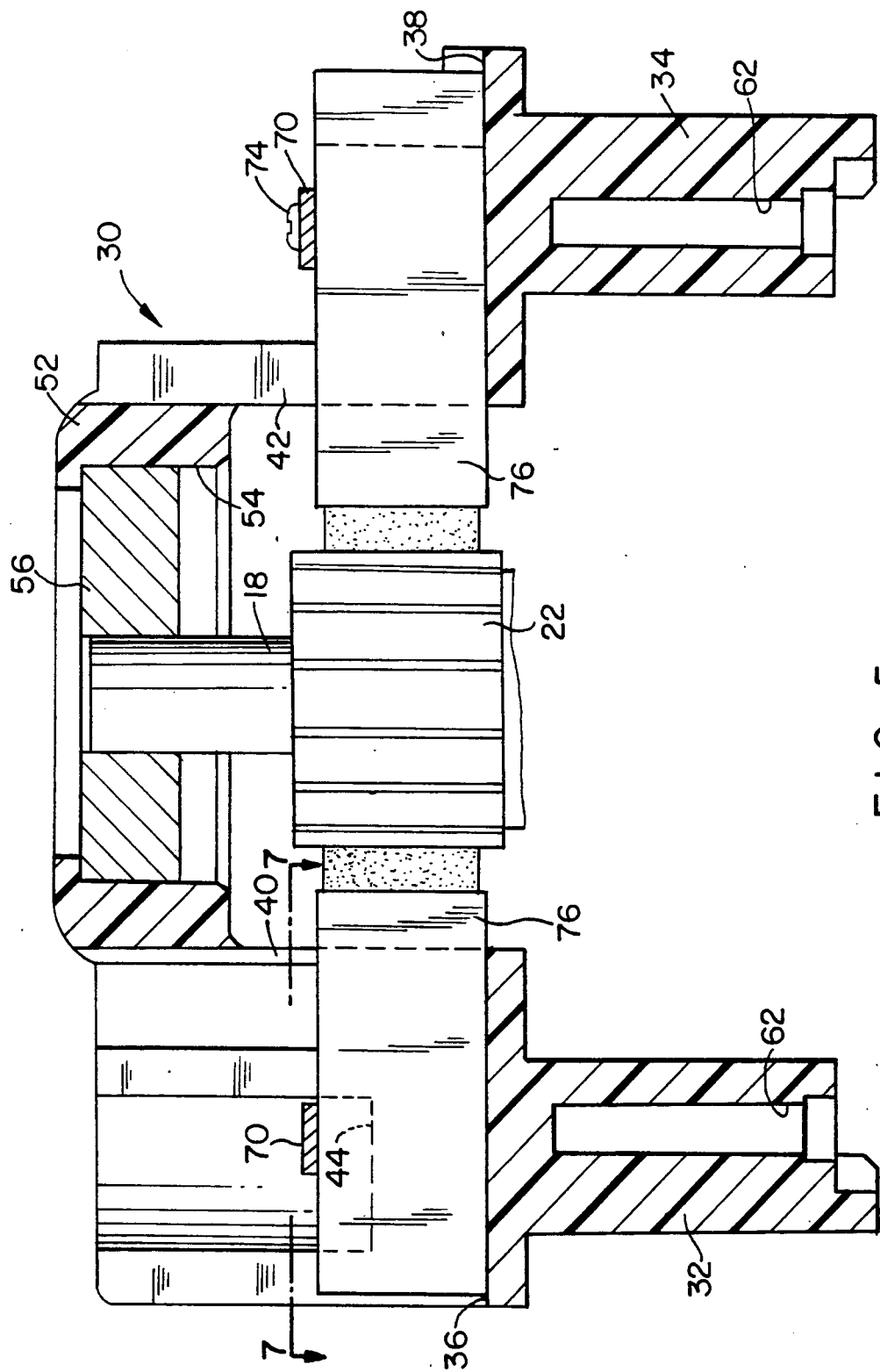
FIG. 5 is a cross sectional view showing part of the armature and a second size brush tube supported in the member of FIG. 2.

To secure the assembly, the fan shroud 28 is formed with a pair of through-bores 58 and the stack 12 is formed with a pair of through-bores 60 which align with the through-bores 58. The pairs of through-bores 58, 60 are diametrically opposed to each other with respect to the axis of the shaft 18. The legs 32, 34 of the member 30 are each formed with a counter-bore 62, (FIGS. 4, 5) which counter-bore 62 is aligned with the through-bores 58, 60. A pair of threaded fastening members 64 extend through the bores 58, 60 and are threaded into engagement with the bore 62 so as to secure the fan shroud 28 to one side of the stack 12 and the member 30 to the other side of the stack 12.

Figure 3:
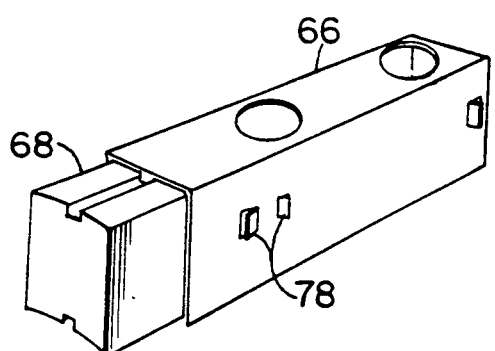
FIG. 3 is a perspective view of a brush tube for use in the assembly of FIG. 1.
Figure 6:
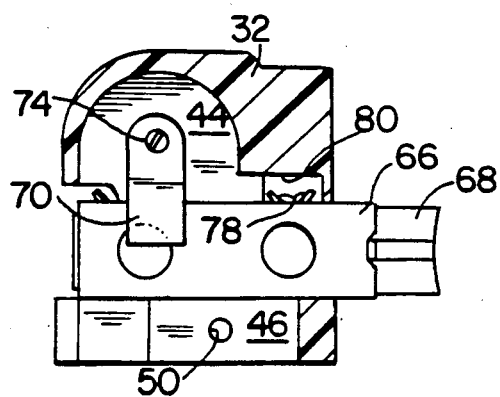
FIG. 6 is a cross sectional view of the member shown in FIG. 4 taken along the line 6—6.
Figure 7:
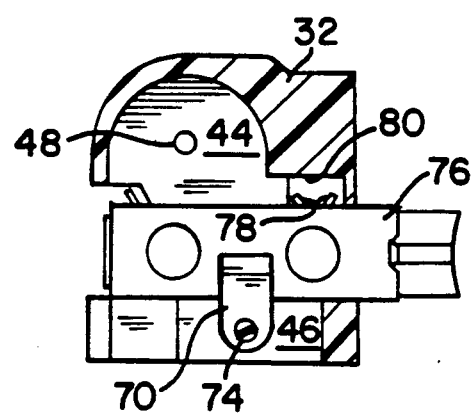
FIG. 7 is a cross sectional view of the member shown in FIG. 5 taken along the line 7—7.

As previously described, the member 30 can accommodate two different size brush tubes. An exemplary brush tube 66 is shown in FIG. 3. As is conventional, the brush tube 66 is formed by stamping and bending conductive sheet material and contains therein a carbon brush 68 which is biased outwardly from the brush tube 66 by means of a spring (not shown). The brush tubes 66 are supported on the ledges 36, 38 and extend to a height above the ledges 36, 38 which is even with the upper surface of the shoulders 44. To clamp the brush tube 66, there is provided a tab 70 overlying both the shoulder 44 and the brush tubes 66, which tab 70 has an opening 72 through which a screw 74 extends for threaded engagement with the interior wall of the bore 48. In the event a different size brush tube 76 is utilized (FIGS. 5 and 7) the brush tube 76 extends to a height which is level with the surface of the shoulders 46. Accordingly, the tab 70 overlies both the shoulder 46 and the brush tube 76 and the screw 74 engages the interior wall of the bore 50 in the shoulder 46.

To locate the brush tubes 66, 76 accurately on the ledges 36, 38 with respect to the commutator 22 and prevent longitudinal movement of the brush tubes, each of the brush tubes 66, 76 is formed with a pair of longitudinally spaced lanced tabs 78 at fixed locations referenced with respect to the brush end of the tubes. The legs 32, 34 are each formed with a notch 80 adjacent the shoulder 44. The notch 80 and the tabs 78 are so dimensioned that the tabs 78 fit within the notch 80 and prevent longitudinal movement of the brush tubes 66, 76.

It is also noted that the legs 32, 34 are open outwardly from the ledges 36, 38 so that longer brush tubes may be accommodated thereby.

Accordingly, there has been disclosed a motor assembly with a combined armature shaft bearing support and brush tube holder which is capable of being utilized with different size motors. While an illustrative embodiment of the present invention has been disclosed herein, it will be apparent to those of ordinary skill in the art that various modifications and adaptations to that embodiment are possible and it is only intended that the present invention be limited by the scope of the appended claims.

I claim:

1. A motor assembly comprising:
    a field including a laminated stack and a field winding supported on said stack;
    an armature including an armature shaft having an axis, an armature winding supported on said armature shaft, a commutator electrically coupled to said armature winding and supported on said armature shaft adjacent a first end thereof, and a fan supported on said armature shaft adjacent the other end thereof;
    a pair of tubes each containing a commutator brush;
    a fan shroud;
    a member acting as a unitary bearing support and brush tube holder, said member having a pair of legs adapted to traddle said first end of said armature shaft with said legs being diametrically symmetrical to each other with respect to axis of the armature shaft, each of said legs being formed with a brush tube support ledge in line with the commutator, each of said ledges being generally planar and orthogonal to the armature shaft axis, said ledges being substantially coplanar with respect to each other, each of said legs being open to the commutator in a region above its support ledge, each of said legs being formed with a first shoulder on one side of said support ledge and a second shoulder on the other side of said support ledge opposite said first shoulder, said first shoulder of each of said legs extending above said support ledge a distance corresponding to the height of a first size brush tube and said second shoulder of each of said legs extending above said support ledge a distance corresponding to the height of a second size brush tube, and means on each of said shoulders for engaging a brush tube clamp; and
    means for securing said fan shroud to one side of said stack and said member to the other side of said stack.

2. The assembly according to claim 1 wherein said assembly further includes a bearing for said armature shaft and said member is formed with a bridge portion connecting said legs at an end thereof, said bridge portion being formed with a recess for holding said bearing.

3. The assembly according to claim 1 wherein each of the commutator brush tubes includes a pair of longitudinally spaced lanced tabs at predetermined fixed reference locations and each of said legs is formed with a notch adjacent each support ledge to accept the pair of longitudinally spaced lanced tabs therein so as to accurately locate the brush tubes on the support ledges and prevent longitudinal movement of the brush tubes.

* * * * *